Sept. 11, 1951 E. B. ELDER 2,567,511
TAPPING MACHINE
Filed April 16, 1945 8 Sheets-Sheet 1
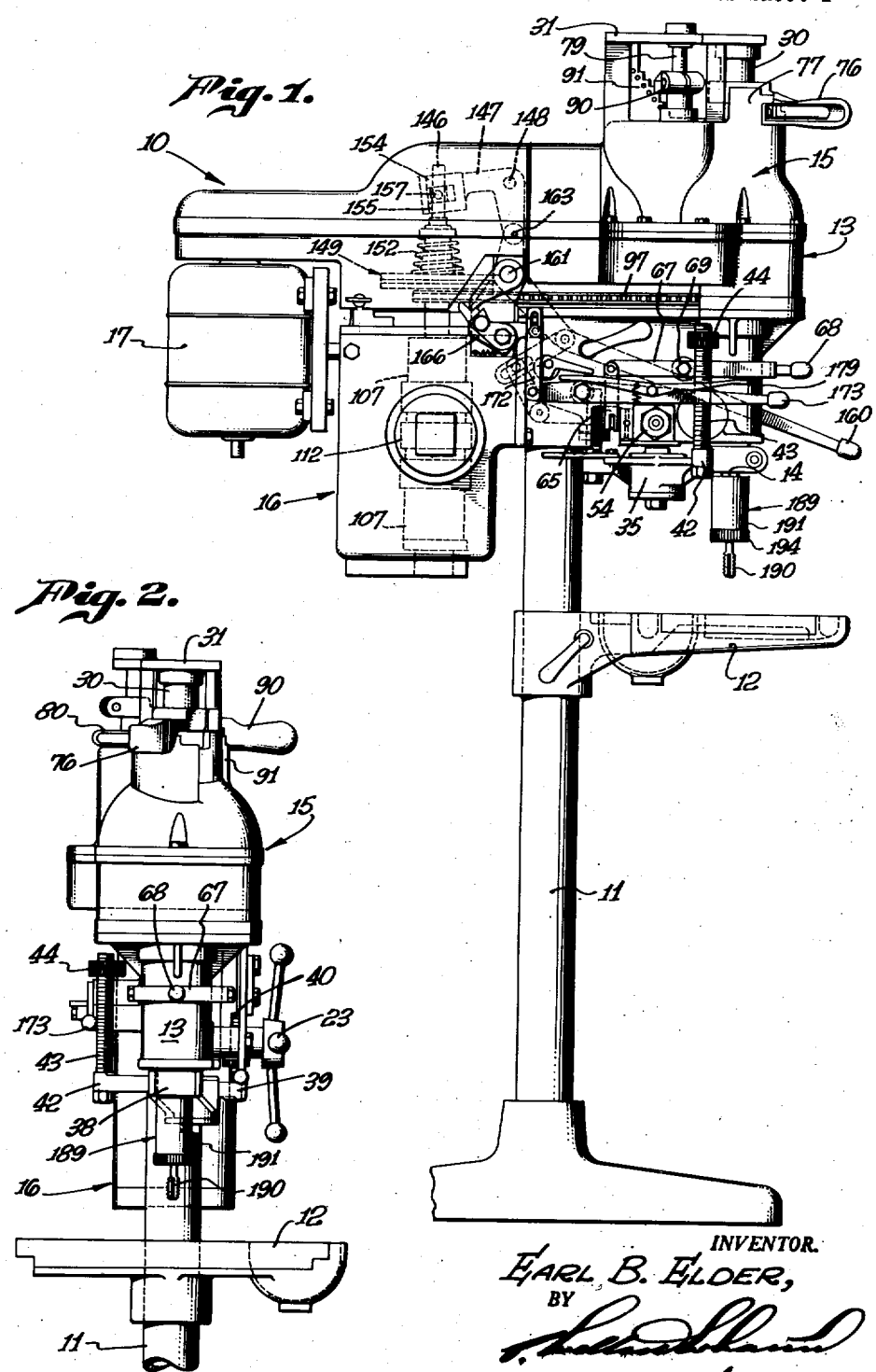
INVENTOR.
EARL B. ELDER,
BY
ATTORNEY.

Sept. 11, 1951     E. B. ELDER     2,567,511
TAPPING MACHINE
Filed April 16, 1945     8 Sheets-Sheet 2
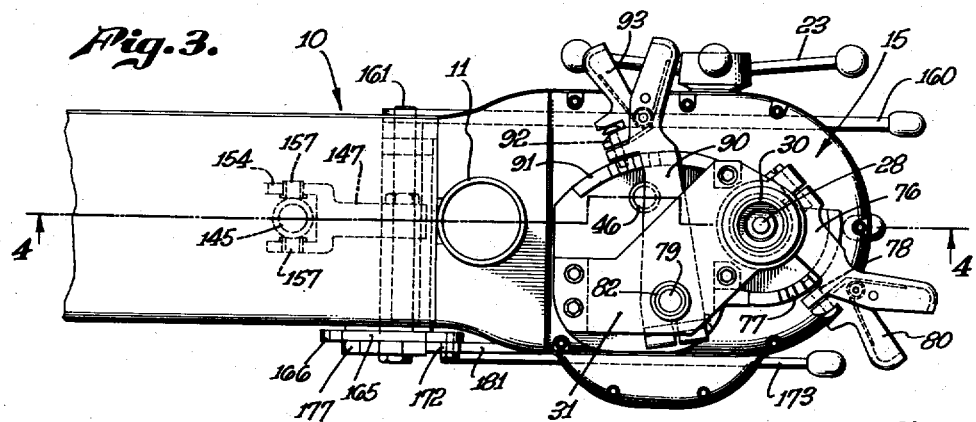
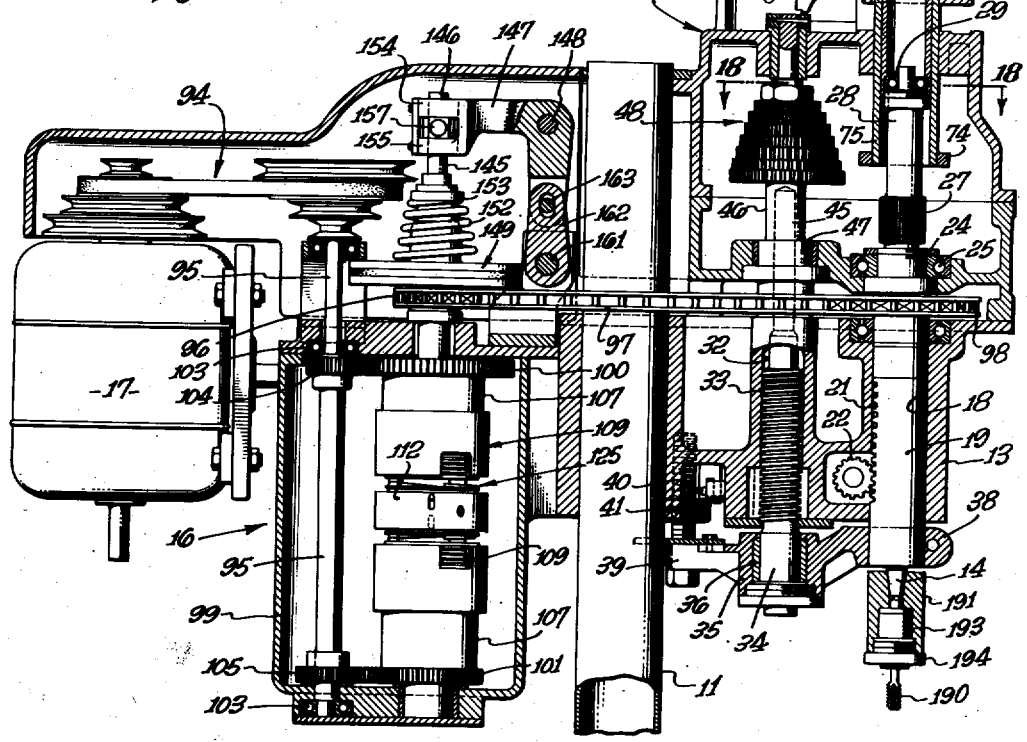
INVENTOR.
EARL B. ELDER,
BY
ATTORNEY.

Sept. 11, 1951      E. B. ELDER      2,567,511
TAPPING MACHINE
Filed April 16, 1945      8 Sheets-Sheet 3
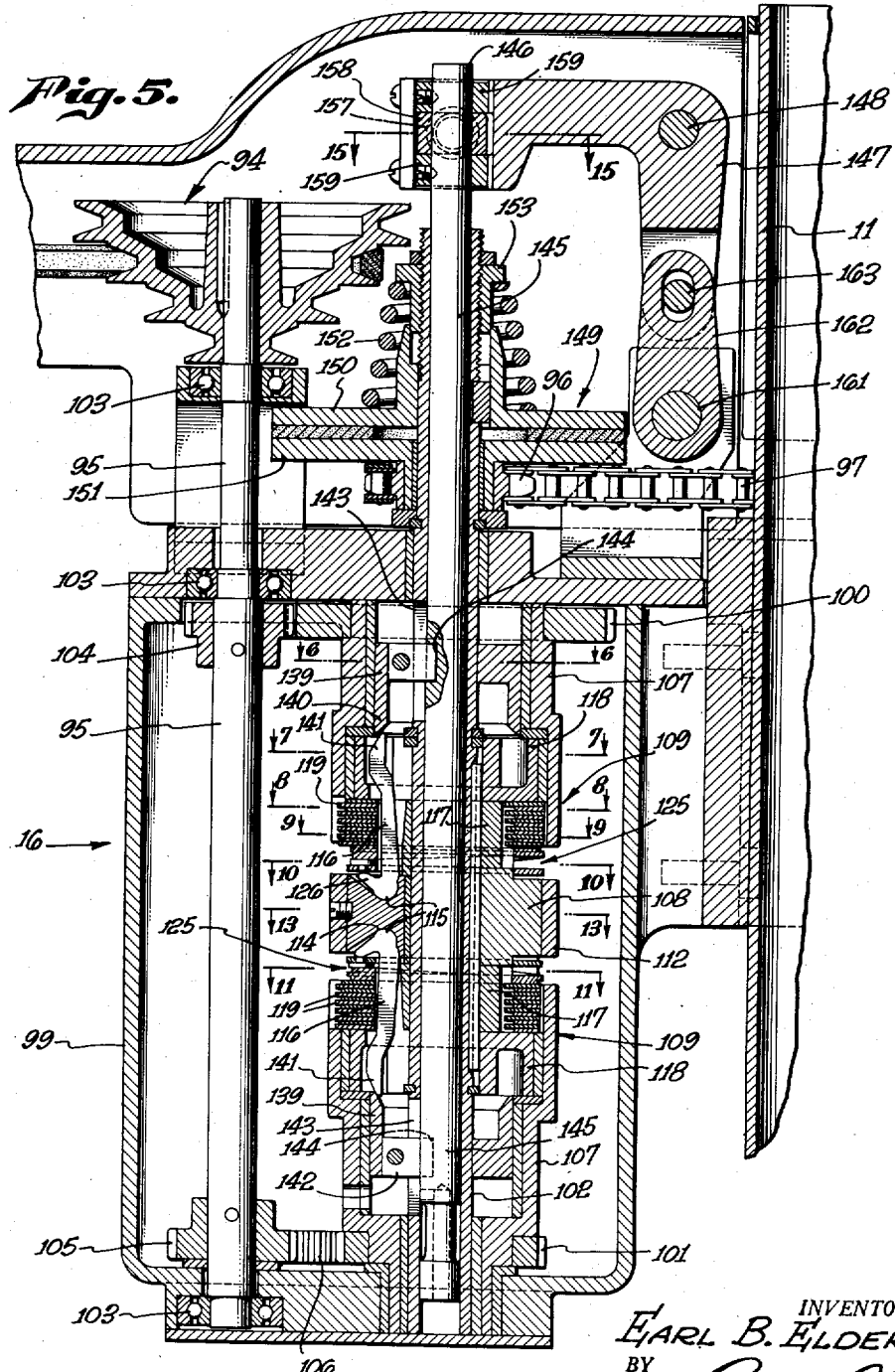
Fig. 5.
INVENTOR.
EARL B. ELDER,
BY
ATTORNEY.

Sept. 11, 1951 E. B. ELDER 2,567,511
TAPPING MACHINE
Filed April 16, 1945 8 Sheets-Sheet 4
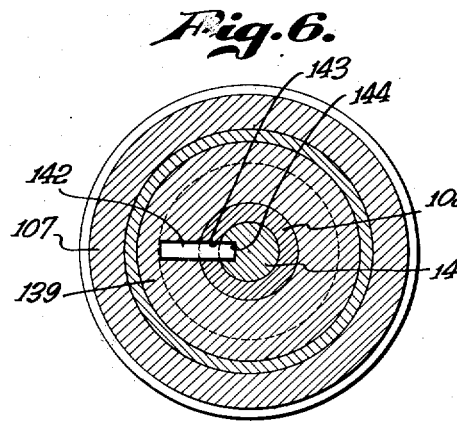
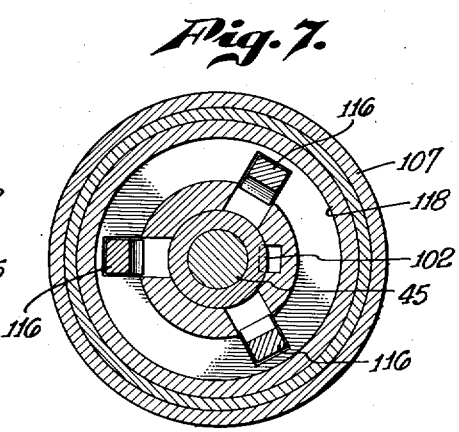
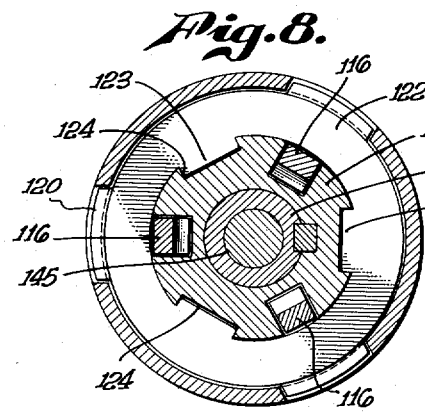
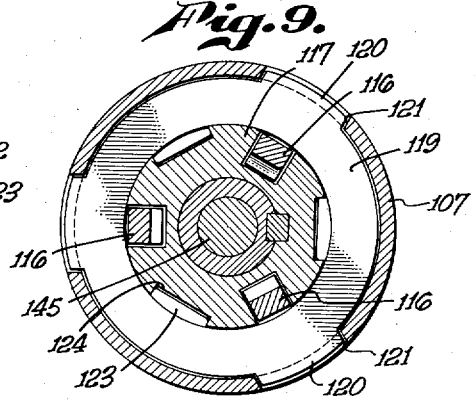
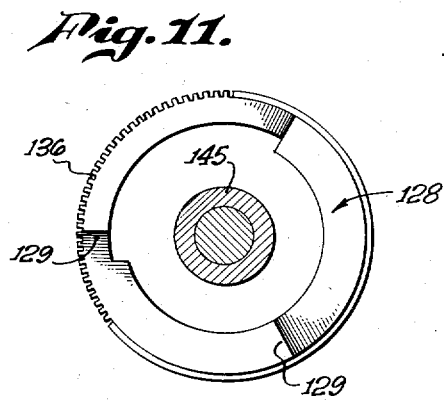
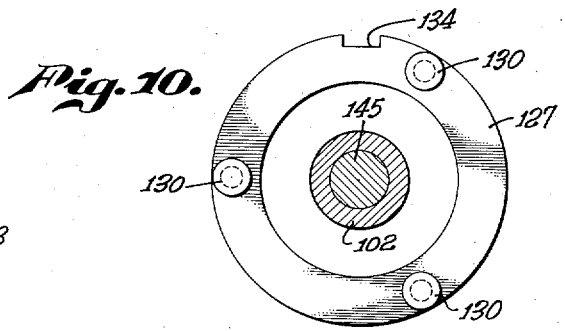
INVENTOR.
EARL B. ELDER,
BY
ATTORNEY.

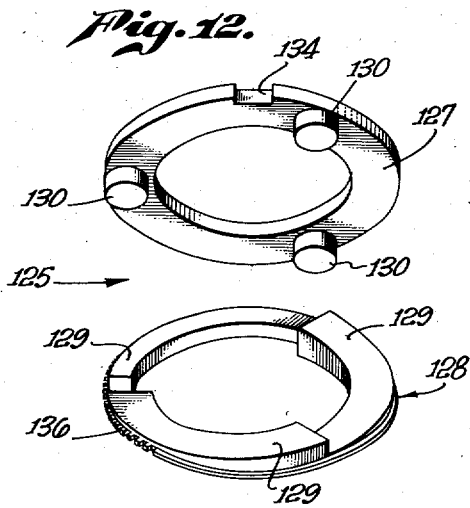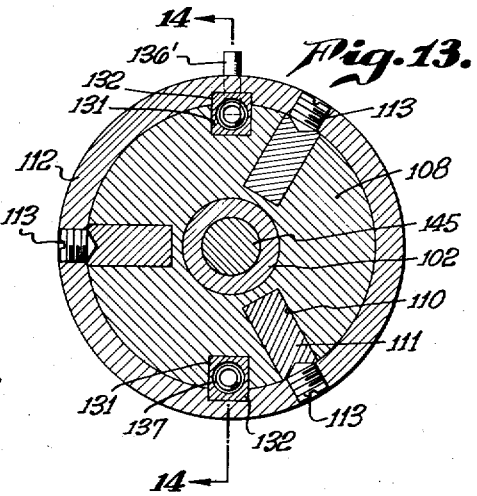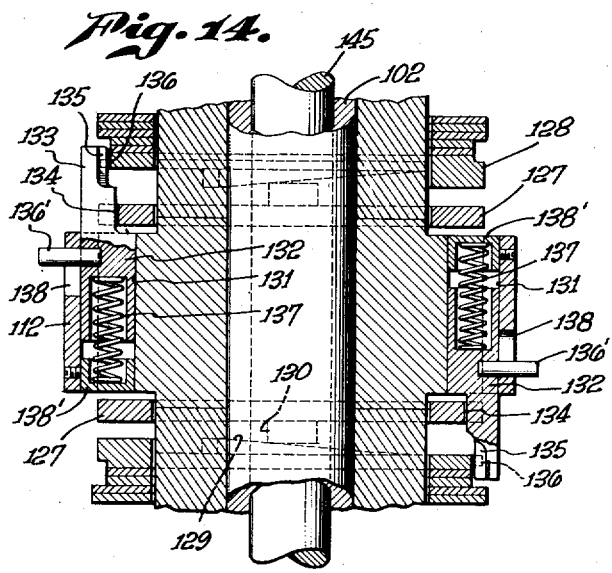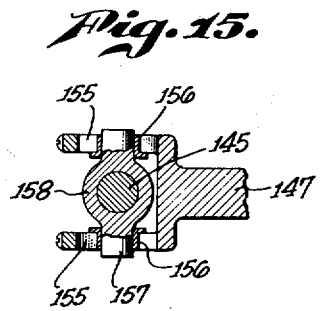

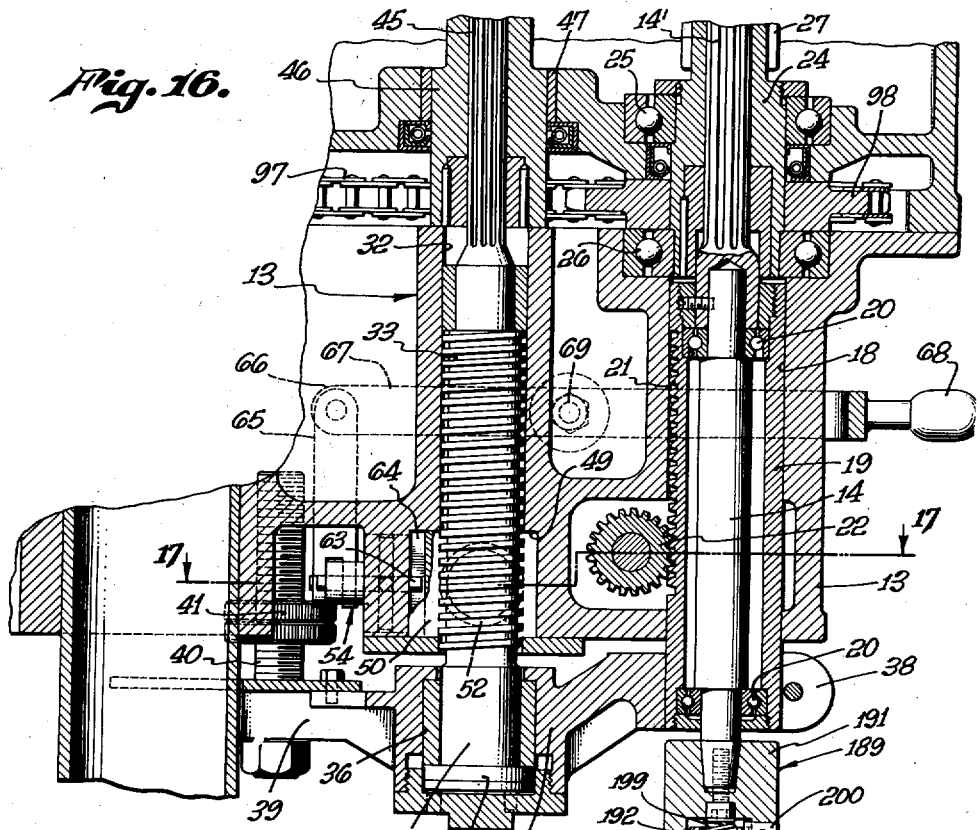

INVENTOR.
EARL B. ELDER,
BY
ATTORNEY.

Sept. 11, 1951          E. B. ELDER          2,567,511
TAPPING MACHINE
Filed April 16, 1945          8 Sheets—Sheet 8
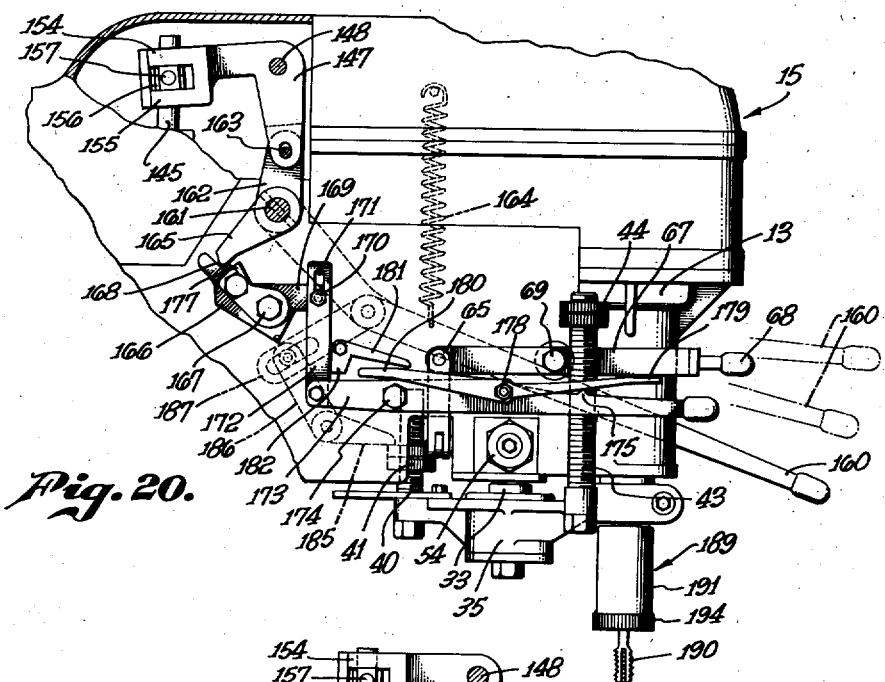
Fig. 20.
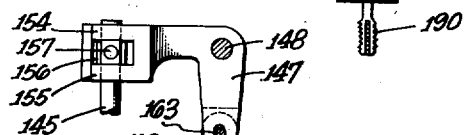
Fig. 22.      Fig. 21.
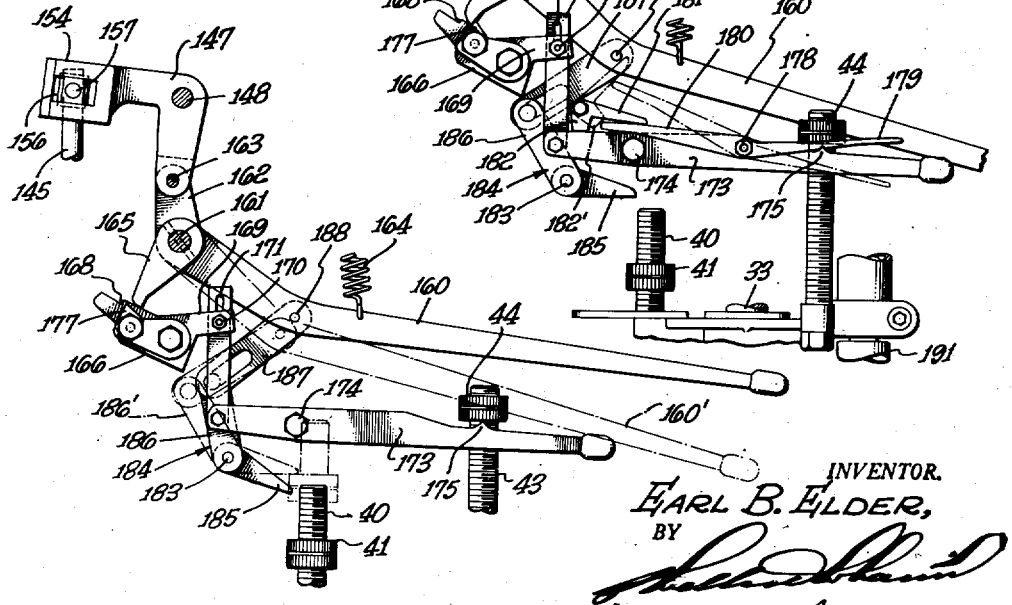
INVENTOR.
EARL B. ELDER,
BY
ATTORNEY.

Patented Sept. 11, 1951

2,567,511

UNITED STATES PATENT OFFICE 2,567,511

TAPPING MACHINE

Earl B. Elder, Arcadia, Calif.

Application April 16, 1945, Serial No. 588,488

7 Claims. (Cl. 10—136)

My invention relates to tapping machines, and relates in particular to a tapping machine unit or head which may be supported on the pedestal of many standard drill presses.

It is an object of the invention to provide a tapping machine by which a large number of different standard threads may be cut without the necessity of replacing any operative part of the device—other than the replacement of the tap itself—when the operation of a tap of different size is required. The invention has as an important advantage in enabling the operation of many different sizes of taps without the necessity of changing lead screws and half nuts. The operator merely places the desired tap in the tapping device and adjusts cooperating parts of the device in accordance with the pitch or lead of the tap which is being used.

An object of the invention is to provide a tapping machine having a spindle for holding and rotating the tap, a single lead screw for producing axial movement of the spindle, and a speed change mechanism through which the lead screw is driven, this speed change mechanism rotating the screw at such different speeds that a large variety of speeds for a corresponding variety of tap thread sizes may be attained. For example, in the applicant's device it is possible by the use of a single lead screw to cut nineteen different standard threads, embracing all of the standard thread pitches from eight to fifty-six inclusive.

An object of the invention is to provide a tapping machine having a spindle which is moved axially by a lead screw driven through a speed change mechanism, this tapping machine having means for compensating for the lost motion or play which must necessarily occur in the gear train of the speed change mechanism.

It is an object of the invention to provide a tapping machine having a drive connection for a tap, whereby the tap is connected to the rotating spindle, this drive connection having a limited rotary free play, so that relative rotary movement of the spindle and tap are provided to compensate for the lost motion in the speed change mechanism. In the present invention, using a single lead screw so that the necessity for changing the lead screw each time the tap size is changed becomes unnecessary, the compensatory action permits the backing out of the tap from the tap hole without cutting or mutilating the threads during the reverse motion of the tap. It is possible, therefore, consistently and continuously to tap holes within close tolerances.

An object of the invention is to provide a tapping machine having the ability to pick up the thread in a previously tapped hole without damaging the thread and maintaining the desired class of fit, and without regard to the orientation of the parts in the jig, providing the part is held axially aligned with the spindle. For example, it is possible to first rough tap blind holes, clear out the chips, and then go back into the holes with a finishing tap, which finishing tap will pick up the roughed thread and produce a finishing cut on the thread, with a great uniformity as to depth, size, and finish of the threads.

It is an object of the invention to provide a tapping machine having a forward and reverse clutch, with automatic means for actuating the clutch, the clutch being of such sensitiveness and responsiveness to control that in the tapping of a thread to a prescribed depth, the spindle may be stopped within one quarter revolution of the predetermined stopping point.

An object of the invention is to provide a tapping machine having automatic stops for controlling the rotation and axial movement of the spindle, which may be changed from automatic to manual operation, or from manual operation to automatic operation without changing the positions of the automatic stops.

It is an object of the invention to provide a tapping machine having novel means for supporting and adjusting the partial nuts which engage the lead screw, whereby a close running fit is maintained between the lead screw and the partial nuts and a lapping of the threads of the partial nuts in engagement with the lead screw is accomplished.

An object of the invention is to provide a tapping machine wherein the stopping and starting of the tapping operation is done without the necessity of disengaging and engaging the partial nuts from the lead screw, this device having a multiple disc clutch which runs in oil and which cooperates with the control elements of the tapping machine and starts and stops the tapping operation. A further object of the invention is to provide a tap holder for connecting the tap to the spindle, this tap holder being so constructed that the tap is supported with a three-way float. That is to say, the tap has guided limited relative movement in three directions. There is relative movement of the tap and spindle in axial direction to permit small differences in axial movement of the tap and spindle when the tap is in engagement with the work. There is rotary relative play of the tap and spindle to compensate for lost motion in the drive for the lead screw, and there is a slight lateral play of the tap to allow for small disalignment of the opening to be tapped and the spindle.

Further objects and advantages of the invention will be brought out in the following part of the specification.

Referring to the drawings which are for illustrative purposes only,

Fig. 1 is a side elevation of a preferred embodiment of my invention mounted on a pedestal.

Fig. 2 is a front elevation of the tapping machine.

Fig. 3 is an enlarged plan view of the forward portion of the tapping machine.

Fig. 4 is a section taken as indicated by the line 4—4 of Fig. 3.

Fig. 5 is an enlarged sectional view of the clutch of the device.

Fig. 6 is an enlarged cross section taken as indicated by the line 6—6 of Fig. 5.

Fig. 7 is an enlarged cross section taken as indicated by the line 7—7 of Fig. 5.

Fig. 8 is an enlarged cross section taken as indicated by the line 8—8 of Fig. 5.

Fig. 9 is an enlarged cross section taken as indicated by the line 9—9 of Fig. 5.

Fig. 10 is an enlarged cross section taken on the line 10—10 indicated in Fig. 5.

Fig. 11 is an enlarged cross section taken as indicated by the line 11—11 of Fig. 5.

Fig. 12 is a perspective view showing the adjustable collar of the clutch mechanism.

Fig. 13 is an enlarged cross section taken as indicated by the line 13—13 of Fig. 5.

Fig. 14 is a section taken as indicated by the line 14—14 of Fig. 13.

Fig. 15 is a fragmentary section taken as indicated by the line 15—15 of Fig. 5.

Fig. 16 is an enlarged fragmentary sectional view showing the spindle and lead screw in association with cooperating parts.

Fig. 17 is a sectional view taken as indicated by the line 17—17 of Fig. 16.

Fig. 20 is an enlarged elevational view of that portion of the tapping machine adjacent the lower end of the lead screw showing the control levers of the device, with the clutch lever positioned for downward movement of the spindle and tap.

Fig. 21 is a fragmentary view showing the clutch lever and the down trip lever at the end of the tapping operation.

Fig. 22 is a fragmentary elevational view showing another position of these levers.

Fig. 23 is a slightly enlarged section taken on the plane indicated by the line 23—23 of Fig. 16.

Figure 19:
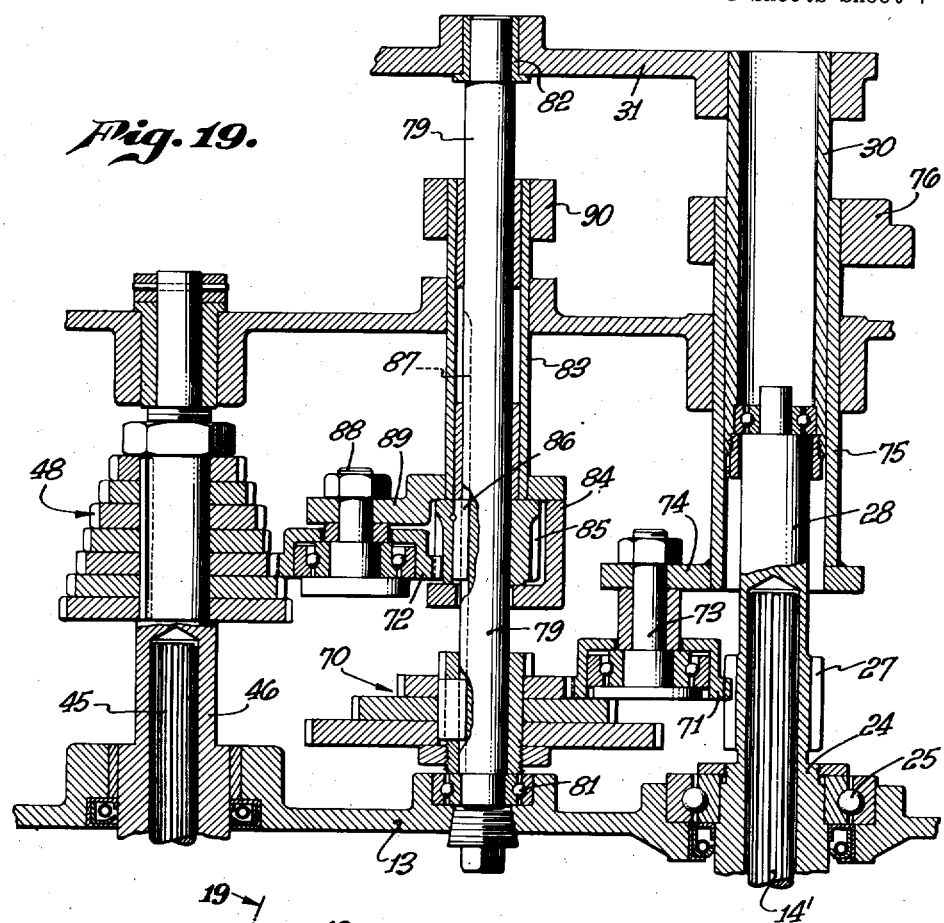
Fig. 19 is a sectional development of the gear train and immediately associated parts taken as indicated by the line 19—19 of Fig. 18.

In Figs. 1 and 2 I show my tapping machine 10 supported on a pedestal 11 on which a work supporting table 12 is adjustable. The machine 10 has a main body 13 in which a spindle 14 is vertically movable. On the upper portion of the main body 13 there is a speed change mechanism 15, and to the rear of the body 13 there is a reversible clutch 16 which is actuated by a motor 17. Figs. 4 and 16 show the interior of the body 13. It has a vertical bore 18 in which a cylindric spindle carriage 19 is slidable, this carriage 19 having bearings 20 at the ends thereof to support the spindle 14. In the rear face of the carriage 19 a rack 21 is cut which rack is engaged by a gear 22 adapted to be rotated by the hand wheel 23, shown in Fig. 2, when manual vertical operation of the spindle is desired.

A splined spindle extension 14' is fixed on the upper end of the spindle 14, and projects upwardly through a sleeve or spindle quill 24 which is supported by bearings 25 and 26, the spindle extension 14' having splined engagement with the quill 24. The quill 24 has a gear 27 on its upwardly extending portion, and the upper end 28 of the quill is supported or guided by a bearing 29 which is held in the lower end of a tube 30, the upper end of which is fixed in a bracket 31, as shown in Fig. 4.

In the main body 13 there is a bore 32 in which a lead screw 33 is rotatable and axially movable. The lower end 34 of the lead screw 33 extends into a body 35 and is rotatably connected to the body 35 by radial bearing means 36 and thrust bearing means 37, enabling rotation of the screw 33 relatively to the body 35 and transmitting the vertical movement of the screw 33 to the body. This body 35 has a forwardly projecting arm 38 which is clamped onto the lower end of the spindle carriage 19 so that the vertical movement of the screw 33 will be transmitted through the body 35 and the carriage 19 to the spindle 14. The body 35 has, as shown in Figs. 1, 2, 16, and 20, an arm 39 carrying an upwardly projecting screw 40 with adjusting nuts 41 thereon, and an arm 42 which carries an upwardly projecting screw 43 having adjusting nuts 44 threaded thereon, the purpose of which will be hereinafter explained. The screw 33 has an upwardly projecting splined stem 45 which slides within and is rotated by a sleeve 46, the lower end of which sleeve is rotatively supported by a bearing 47, shown in Fig. 16. As shown in Fig. 4, the upper portion of the sleeve 46 has thereon a gear cluster 48 forming a part of the speed change mechanism.

As shown in Figs. 16 and 17, the main body 13 has therein a transverse opening 49 of rectangular cross section, this opening 49 intersecting the lower end of the bore 32 so that the opposite end portions of the opening 49 may serve as guides for blocks or carriages 50 which are slidable in these guides toward and away from the screw 33. Each carriage 50 has an opening 51 in which a partial nut 52 is adjustable toward and away from the screw 33 so as to make proper working engagement with the screw 33, by means of an adjusting screw 53 which threads into the outer end of the carriage 50 and is rotatably held in a cap 54' secured in the outer end of the carriage 50. By rotation of the screws 53, the partial nuts 52 may be positioned so as to snugly engage the screw 33 when the blocks 50 are moved to their innermost positions. The carriages 50 are moved back and forth with relation to the screw 33 by crank means 54 which are duplicate in their characters but are disposed at opposite hand. Each crank means 54 includes a cylindric body or disc 55 which is turnable in a cylindric opening 56 in the side wall 57 adjacent the opening 49, each disc or body 55 having a peripheral channel 58 which is engaged by the inner end of a screw 59 to prevent the disc 55 from leaving the opening 56 in which it is turnable. Each crank member 54 includes a crank element or lever 60 which is secured to the associated disc 55 by means of a screw 61, the lever 60 having an extension 62 which is bored to receive a pin 63, the inner end of which pin engages a vertical slot 64 in the adjacent carriage 50. In Fig. 16 and Fig. 17 the crank elements 54 are in perpendicular relation to the lead screw 33—that is to say, they lie in a plane which is substantially perpendicular to the screw 33—and when in this position, the pins 63 thereof hold the carriages 50 in their closest relation to the screw 33, at which time the partial nuts 52 engage the threads of the screw 33. By rotation of the crank means 54, the pins 63 may be caused to move through arcs and to carry the members 50 outwardly from the locked positions in which they are shown with relation to the screw 33, thereby retracting the partial nuts 52 from the screw 33. For rotation of the crank means 54, links 65 are connected to the outer ends of the lever elements 60 of the crank means, these links 65 extending upwardly on opposite sides of the main body 13 and having their ends pivotally connected to the ends 66 of a bifurcated hand lever 67, the handle 68 of which is disposed at the front of the device, convenient for operation by the workman. The lever 67 swings on screws 69, and whenever desired, this lever 67 may be swung from the neutral position in which it is shown in Fig. 16, thereby transmitting motion through the links 65 to the crank means 54, so that the carriages 50 and the partial nuts 52, supported thereby, will be retracted, and the lead screw 33 released so that it may have free vertical movement in the opening 32, as the spindle carriage 19 is moved vertically, as a result of rotation of the gear 22 in engagement with the rack 21. When it is desired to remove the carriages 50, for example, for the purpose of replacing the partial nuts 52, the pins 63 may be moved outward or removed from the levers 60 to disengage the slots 64 of the carriages 50.

Figure 18:
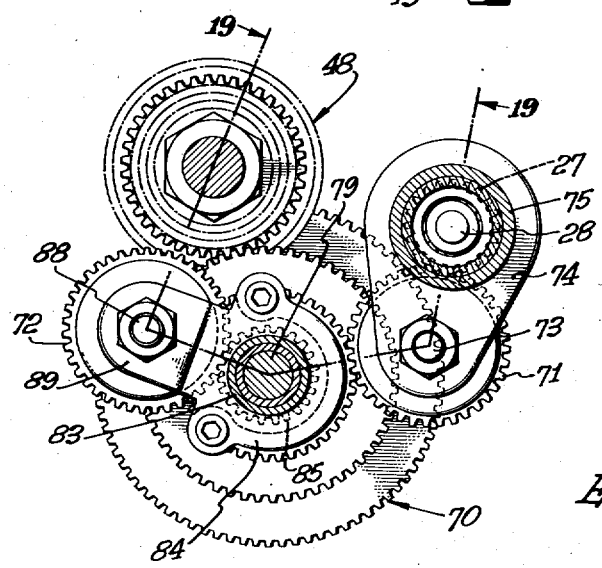
Fig. 18 is a sectional view taken as indicated by the line 18—18 of Fig. 4, showing a plan of the gear train of the speed change mechanism.

As shown in Figs. 4, 18, and 19, the speed change mechanism includes a second gear cluster 70 in addition to the gear cluster 48, and two shifting gears 71 and 72 for transmitting rotation to the gear clusters 70 and 48 respectively. The shifting gear 71 is supported by means of a pin 73 on a lever 74 which swings around the axis of the gear 27, the shifting gear 71 being in continuous engagement with the gear 27. The lever 74 is mounted on the lower end of a tube 75 which is slidable and rotatable upon the tube 30 which supports the upper end 28 of the quill 24. On the upper end of the tube 75 there is a lever 76 which is manually swingable along a stepped plate 77. As shown in Fig. 3, the lever 76 is provided with a locking pin 78 movable into and out of engagement with the plate 77 by means of a small handle 80 pivoted on the outer portion of the lever 76. By means of the lever 76, the tube 75 may be rotated and shifted vertically, enabling movement of the gear 71 vertically with relation to the gear 27 and horizontally into engagement with any one of the separate gear elements of the cluster 70, thereby providing a speed change between the gear 27 and the shaft 79 on the lower end of which the gear cluster 70 is fixed.

The shaft 79 is supported in vertical position by a lower bearing 81 and an upper bearing 82. The shaft 79 also rotates within a vertical tube 83 having a cage 84 at its lower end, in which a gear 85 is rotatable. The gear 85 has a key 86 which engages a long keyway 87 in the shaft 79, whereby the rotation of the shaft 79 is transmitted to the gear 85. The shifting gear 72 is rotatably mounted upon a pin 88 carried by a lever 89 which is fixed on the lower end of the tube 83. The shifting gear 72 is in continuous meshed engagement with the gear 85, so that this gear 72 is caused to rotate whenever the shaft 79 rotates. The lever 89 may be rotated around the axis of the shaft 79, and may be moved vertically so that the gear 72 may be brought into engagement with any of the gear elements of the gear cluster 48, thereby providing a speed change between the shaft 79 and the shaft or sleeve member 46 which has splined engagement with the stem 45 of the lead screw 33.

The tube 83 has on its upper portion a lever 90 arranged to swing with relation to a stepped plate 91. This lever 90, as shown in Fig. 3, has a locking pin 92 adapted to be moved into and out of engagement with the stepped plate 91 by a handle 93 which is pivoted on the outer portion of the lever 90. As the lever 90, by vertical and swinging movement, is adjusted along the stepped plate 91, the tube 83 will be correspondingly moved so as to shift the gear 85 vertically and also bring the shifting gear 72 into engagement with appropriate gear elements of the gear cluster 48.

As shown in Fig. 4, the motor 17, through adjustable belt and pulley means 94, drives the power input shaft 95 of the clutch mechanism 16, and power from the clutch mechanism 16 is transmitted through the output sprocket 96 of the clutch mechanism 16 to a drive chain 97 which runs around a sprocket 98 which is fixed on the spindle quill 24. The power means of the tapping device accordingly drives the spindle and synchronously or simultaneously therewith drives the lead screw 33 through the gears of the speed change mechanism 15, which receives power from the gear 27 which is formed on the quill 24 and is therefore rotated by the sprocket 98.

Referring now to Fig. 5, the clutch mechanism 16 has a shell 99 adapted to be filled with oil. In the upper part of the shell 99 there is a forward gear 100 and in the lower part of the shell 99 there is a smaller reverse gear 101, both gears 100 and 101 being supported so as to rotate upon a vertical axis defined by a hollow shaft or tube 102. The power input shaft 95 of the clutch mechanism 16 is supported by a plurality of bearings 103, and in the upper part of the shell 99 the shaft 95 has a small pinion 104 in direct engagement with the forward gear 100, to drive the gear 100 at relatively slow speed. A pinion 105 fixed on the lower portion of the shaft 95 drives an idler 106 which is meshed with the reverse gear 101, to drive the gear 101 at relatively high speed and in a direction reverse to the rotation of the gear 100. The gears 100 and 101 are fixed upon clutch shells 107 which are substantially identical and which extend toward a clutch body 108 which occupies a fixed position on the hollow shaft 102 substantially centrally between the gears 100 and 101. Upper and lower disc clutch assemblies 109 of identical form and construction are operative between the shells 107 and the clutch body 108, whereby the upper clutch shell 107 may be drivably connected to the body 108 to rotate the tubular shaft 102 in forward direction, or the lower clutch shell 107 may be drivably connected to the clutch body 108 to drive the tubular shaft 102 in reverse direction and at relatively higher speed. As shown in Fig. 13, the clutch body 108 has three channels 110 cut thereacross in which blocks 111 are fitted, these blocks being held in place by a ring 112, which extends around the body 108 and has set screws 113 to engage the blocks 111. As shown in Fig. 5, each of the blocks 111 has sockets 114 in its opposite end to receive the rounded ends 115 of clutch actuating levers 116 which extend toward and into the ends of the shells 107.

Adjacent the upper and lower faces of the body 108 are annular inner disc supports 117 of the clutch assemblies 109, shown in section in Figs. 8 and 9. Adjacent the ends of the members 117 are collars 118 lying within the enlarged portions of the shells 107, and supporting such portions for rotation on the axis of the tubular shaft 102. Each clutch assembly 109 includes a plurality of clutch plates or rings 119 having peripheral extensions 120 which extend into slots 121 in the shells 107 to prevent relative rotation of the plates 119 and the shells 107. The clutch assemblies 109 also include clutch rings or plates 122 having inwardly directed extensions or tongues 123 to engage slots 124 which are formed in the inner disc supports 117. Between the assemblies of plates or discs 119 and 122 and in the upper and lower faces of the body 108 there are adjustable collars 125 adapted to be engaged by the short arms 126 of the levers 116 to apply pressure to the clutch disc assemblies when the levers 116 are selectively rotated, for the purpose of selectively actuating the clutch means. Each of the adjustable collars 125 consists of a pair of rings 127 and 128 which fit together and which are so formed that relative rotation of these rings 127 and 128 will change the collar width, the purpose of changing the width of the collars 125 being to adjust the pressure exerted against the clutch disc assemblies when the associated levers 116 are swung inward to their maximum extent. Each ring 128 has several cam surfaces 129 formed thereon, such faces 129 being disposed helically. The rings 127 each have a number of projections 130 corresponding to the number of cam faces 129, to engage the faces 129 and slide thereon during adjustment of the collars.

As shown in Figs. 13 and 14, the bodies 108 have longitudinal channels 131, in which locking bars 132 are held in slidable relation by the ring 112. Each of these locking bars 132 has an extension 133 for engaging a notch 134 in the periphery of a ring 127 and a reduced portion 135 for engagement with the toothed periphery segment 136 of the associated ring 128. Each locking bar 132 is held outward in the position in which it is shown in Fig. 14 by means of a spring 137, and each locking bar 132 has a pin 136' projecting therefrom through a slot 138 in the ring 112 for manual engagement, whereby the locking bar 132 may be retracted a sufficient distance to disengage the end portion 135 thereof from the toothed segment 136 of the associated ring 128, to permit rotation of the ring 128 and thereby change the width of the adjustable collar 125. The rear ends of the springs 137 are restrained by filler pieces 138', as shown in Fig. 14.

Within each clutch shell 107 there is a slidable clutch actuator 139 having a lip 140 to engage the champfered ends of the long arms 141. Each clutch actuator 139 is longitudinally slidable on the tubular shaft 102, and is provided with a key 142 which projects through a slot 143 in the tubular shaft 102 to engage a socket or recess 144 in a bar 145 which is axially slidable within the tubular shaft 102 and has its upper end 146 projecting from the upper end of the tubular shaft for engagement by a shifting means comprising a lever 147 which is swingable on a pin 148. When the shifting bar 145 is in the intermediate or neutral position in which it is shown in Fig. 5, the tubular shaft 102 and the parts supported directly thereon remain stationary, whereas the upper and lower clutch shells 107 are in continuous rotation so that the clutch rings or discs 119 rotate with relation to the clutch rings or discs 122. When the bar 145 is moved downward a short distance from its position in Fig. 5, the upper clutch actuator 139 will engage the upper set of clutch actuating levers, to actuate the upper clutch assembly 109, whereupon the tubular shaft 102 will be rotated in forward direction. An upward movement of the bar 145 from its neutral position will move the lower clutch actuator 139 upward to engage the lower set of clutch actuating levers 116 to actuate the lower clutch assembly 109, whereupon the tubular shaft 102 will be driven in reverse direction. It will be noted that the clutch actuating levers 116 are not swung on pivot pins and accordingly have maximum strength at the point of joinder between the joint lever arms 126 and the long lever arms 141 thereof, where greater strain occurs. To accomplish this desired effect, the members 116 are articulated with relation to the clutch body 108 by the provision of the socket 114 to receive the extremities of the members 116 and permit a limited rotation thereof without use of pivot pins.

The shaft 102 drives the sprocket 96 through a friction drive element 149, so that the torque applied to the tap which is being operated will be limited to the torque transmitting capacity of the friction drive element 149. This friction drive element comprises a disc 150 which is keyed upon the upper portion of the tubular shaft 102, a second disc 151 which is turnable on the tubular shaft 102 and is connected to the sprocket 96, a spring 152 and a nut 153 which is threaded upon the upper end of the tubular shaft 102 so as to be adjusted downwardly to compress the spring 152 to the desired extent. The lever 147 has upper and lower pairs of fingers 154 and 155 as shown in Figs. 5, 15, and 20. In the space between each upper finger 154 and lower finger 155 there is a slide block 156 which receives a trunnion 157 which projects from a body 158 in which the upper part of the bar 145 rotates. Above and below the body 158 collars 159 are fixed on the bar 145 so that as movement of the lever 157 moves the body 158 vertically, such movement will be transmitted to the bar 145 through the collars 159.

As best shown in Fig. 20, a clutch operating handle 160 is provided, this handle 160 being located on the far side of the main body 13, and being fixed on the end of a transverse shaft 161, which defines an axis on which the handle 160 may be swung between the three positions thereof shown in Fig. 20, wherein the handle 160 is shown in its down position, for operating the clutch so as to rotate the tap in forward direction and feed the tap downward. When the handle 160 is in this down position, the short lever 162 which is pinned on the shaft 161 rotates the lever 147 in counterclockwise direction through a pin interengagement 163, the bar 145 being accordingly moved downward so as to actuate the upper clutch assembly 109 shown in Fig. 5. A spring 164 urges the clutch operating handle 160 upward.

Upward movement of the clutch operating handle 160 is prevented, as shown in Fig. 20, by a clutch latching mechanism which consists of a finger 165, pinned on the near end of the shaft 161 and a latching lever 166 which is swingable on a screw 167 mounted in the near face or wall of the shell structure of the tapping machine. This latching lever 166 has a shoulder 168 which engages the end of the finger 165 so as to prevent counterclockwise rotation of the shaft 161 and keep the handle 160 from swinging upward from the position in which it is shown in full lines in Fig. 20. The rightward extension 169 of the latching lever 166 carries a screw 170 which works in a slot 171 in the upper end of a link 172 pivotally connected to the leftward end of a releasing lever 173 which is hinged upon a screw 174. The releasing lever 173 has a prominence 175 lying in the path of movement of the adjusting nuts 44 of the screw 43.

As the lead screw 33 travels downward in response to the forward actuation of the device resulting from the movement of the handle 160 into its down position, the nuts 44 move downward toward the prominence 175, finally engaging the same as shown in Fig. 21, and swinging the releasing lever 173 in clockwise direction so as to move the link 172 upward. The upward movement of the link 172 is transmitted through the screw 170 to the latching lever 166, rotating the same in counterclockwise direction so as to remove the shoulder 168 from engagement with the end of the finger 165, whereupon the finger 165 may swing in counterclockwise direction from the position in which it is shown in Fig. 20 to the position in which it is shown in Fig. 21 to engage a stop 177 which is retractably mounted on the latching lever 166. This stop 177 is positioned so as to stop the upward movement of the clutch operating handle 160 in its neutral position, so that at this time the clutch actuating bar 145 will be returned to neutral position, and the clutch 16 will be neutral or inoperative. In this manner the tap will be stopped in the position determined by the setting of the nuts 44.

A pin 178, carried by the lever 173, supports an auxiliary lever 179, the rearward or leftward end 180 of which is adapted to engage the lever 181 of a pivotally supported stop lug 182 positioned in the upward path of movement of the leftward end of the lever 173, as shown in Fig. 21. This stop lug 182, when it is positioned as shown in Fig. 21, limits the upward movement of the link 172, to prevent an upward movement of the link 172 which will rotate the latch lever 166 counterclockwise from the position in which it is shown in Fig. 21, in which position the stop 177 engages the finger 165. The operator may at this time reverse the direction of operation of the tapping device so as to retract the tap from the tapped hole, by pressing downwardly on the forward end of the auxiliary lever 179, so that the leftward end 180 thereof will engage the lever 181 associated with the stop lug 182, and rotate the stop lug 182 into the position in which it is shown in dotted lines 182', to permit a further clockwise rotation of the lever 73 and accomplish, through the link 172, a counterclockwise rotation of the latching lever 166 which will carry the stop 177 downward out of engagement with the finger 165. The spring 164 may then swing the clutch operating handle 169 into its up position, shown in dotted lines in Fig. 20, and rotate the shaft 161 and the lever 162 counterclockwise from the position shown in Fig. 22, thereby rotating the lever 147 in clockwise direction and raising the clutch actuating bar 145 from its neutral position to actuate the lower clutch assembly 109 of the clutch 16 to drive the tapping device in reverse direction.

If the operator desires to have the tapping device reverse automatically when it reaches the end of the down movement of the tap, he may retract the stop 177 by swinging it on the latching lever 166 into the position in which it is shown in Fig. 22. Then, when the adjusting nuts 44 act through the lever 173 and the link 172 to rotate the latching lever 166 in counterclockwise direction from the position in which it is shown in Fig. 20 to release the shoulder 168 from engagement with the finger 165, the finger 165 will be permitted to swing into the position in which it is shown in Fig. 22, whereupon the lever 147 will swing from the position in which it is shown in Fig. 20 through the neutral position in which it is shown in Fig. 21 to the clutch reversing position in which it is shown in Fig. 22.

On the far side of the device, below the clutch operating handle 160, there is a pivot member 183 on which a fulcrumed lever 184 is swingable. This lever 184 has a forwardly projecting finger 185 disposed with its end in the path of upward movement of the nuts 41 which are adjustable on the screw 40. The fulcrumed lever 184 has also an arm 186, the outer end of which is connected through a slotted link 187 with a pivot member 188 carried by the handle 160. Referring to Fig. 22, when the tapping device is operating in up or reverse direction and the upper adjusting nut 41 moves in engagement with the end of the finger 185, the lever 184 will be thereby rotated in counterclockwise direction into a position indicated by dotted lines 186', to transmit motion through the link 187 to the arm 160 to move the arm 160 down into its neutral position indicated by dotted lines 160' in Fig. 22, causing the shifting of the mechanism of the clutch 16 into neutral position and stopping the power driven elements of the tapping machine.

An important feature of the invention resides in the floating drive connection 189, shown in detail in Fig. 16, for connecting a tap 190 to the spindle 14 of the device. The drive connection 189 includes a shell 191 which is connected to the lower end of the spindle 14, this shell 191 having a downwardly faced recess 192 which receives the upper portion of a holder element specifically shown as a cylindrical tap holding body 193. The body 193 is held in the recess 192 in such manner that it may have limited vertical or axial movement by a retaining ring 194 having a threaded portion which screws into the threaded counterbore 195 disposed at the lower end of the recess 192. The body 193 has an axial opening 196 to receive the shank of the tap 190 and screws 197 are provided for clamping the shank of the tap 190 in the body 193. The upper portion of the body 193 has an upwardly faced recess 198 to accommodate a portion of a spring 199 which acts to resiliently urge the body 193 toward its lowermost position.

The shell 191 has a shoulder member 200 in the form of a key to cooperate with shoulders 201 and 202 which are formed on the body 193. The shoulders 201 and 202 are so spaced in angular relation to the shoulder member 200 that a limited free rotary or angular play is provided between the body 193 and the shell 191. The shoulder member 200 is shown in Fig. 23 in its position against the shoulder 202 of the body, assumed when the tap 190 is being rotated forwardly in engagement with the part being tapped. When the end of the tapping action is reached, and the direction of rotation of the spindle 14 is reversed for the purpose of withdrawing the tap, the spindle 14 and the parts directly connected thereto may rotate through a part of a revolution without reverse rotation of the tap 190, until the shoulder 200 engages the shoulder 201 of the body 193. This rotary movement of the spindle 14 relatively to the tap 190 at the beginning of the reverse rotation of the spindle 14 permits all of the lost motion or play in the drive parts between the quill 24 and the lead screw 33 to be taken up, and reverse rotation of the lead screw 33 is started, before the shoulder member 200 engages the shoulder 201 and starts the reverse rotation of the tap 190. The body 193 is externally slightly smaller than the recess 192 in which it operates, and therefore has a slight universal or rocking movement relatively to the shell 191. The drive connection 189 supports the tap 190 with what may be called a three-way float, since the tap 199 floats in three directions relatively to the shell 191. It has axial play or float, rotary play or float, and a limited play for axial disalignment. It will be understood that several bodies 193 may be provided having openings 196 to receive taps of different sizes.

I claim as my invention:

1. In a tapping mechanism of the character described, for operating a tap, the combination of: a spindle arranged for axial and rotary movement; power means; a screw and nut assembly connected to said spindle so that said spindle will be moved axially upon rotation of said screw; a speed change gear mechanism having its output end connected to the screw of said screw and nut assembly to rotate said screw whereby the movement of the spindle may be correlated to the pitch of the thread of the tap; a spindle drive member engaging said spindle and having sliding engagement therewith to enable axial movement of said spindle relatively to said drive member; drive means, comprising a reversing clutch connecting said power means to said spindle drive member to rotate the same; a drive connection from said spindle drive member to the input of said speed change gear mechanism; means operating said clutch of said drive means whereby the power of said power means may be applied in either forward or reverse direction; and means for connecting a tap to the tap end of said spindle.

2. In a tapping mechanism of the character described for operating a tap, the combination of: a spindle arranged for axial and rotary movement; power means; a screw and nut assembly connected to said spindle so that said spindle will be moved axially upon rotation of said screw; a speed change gear mechanism having its output end connected to the screw of said screw and nut assembly to rotate said screw whereby the movement of the spindle may be correlated to the pitch of the thread of the tap; a spindle drive member engaging said spindle and having sliding engagement therewith to enable axial movement of said spindle relatively to said drive member; drive means, comprising a reversing clutch connecting said power means to said spindle drive member to rotate the same; a drive connection from said spindle drive member to the input of said speed change gear mechanism to simultaneously drive said screw; means operating said clutch of said drive means whereby the power of said power means may be applied in either forward or reverse direction; and a drive connection between the spindle and the tap, said drive connection having therein a free rotary play whereby said spindle may rotate relatively to said tap through a limited angular distance, and axial play to compensate for differences in axial movement of said tap and said spindle while the tap is in engagement with the part being tapped.

3. In a tapping mechanism of the character described, for operating a tap, the combination of: a spindle arranged for axial and rotary movement; power means; a screw and nut assembly connected to said spindle so that said spindle will be moved axially upon rotation of said screw; a speed change gear mechanism having its output end connected to the screw of said screw and nut assembly to rotate said screw whereby the movement of the spindle may be correlated to the pitch of the thread of the tap; a spindle drive member engaging said spindle and having sliding engagement therewith to enable axial movement of said spindle relatively to said drive member; drive means, comprising a reversing clutch connecting said power means to said spindle drive member to rotate the same; a drive connection from said spindle drive member to the input of said speed change gear mechanism; means operating said clutch of said drive means whereby the power of said power means may be applied in either forward or reverse direction; and means for connecting said tap to the tap end of said spindle, comprising telescoped parts, one of which is connected to said spindle and the other of which is connected to said tap, said parts having axial relative movement to compensate for differences in axial movement of said spindle and said tap when the tap is in engagement with the part being tapped, and having driving shoulder means and driven shoulder means permitting a limited free rotary movement of said parts, and spring means operative between said parts to yieldably maintain the same in an initial position.

4. In a tapping machine of the character described for operating a tap, the combination of: a spindle arranged for axial and rotary movement; a screw connected to said spindle so that axial movement of said screw will produce axial movement of said spindle; guides disposed on opposite sides of said screw; carriages movable on said guides toward and away from said screw; means for locking said carriages in positions near to said screw; partial nuts supported by said carriages so as to be moved toward and away from said screw; means operative between said partial nuts and said carriages to adjust said partial nuts toward said screw so that adjusted engagement of said partial nuts with said screw may be obtained; a spindle drive member engaging said spindle and having sliding engagement therewith to enable axial movement of said spindle relatively to said drive member; power driven means connected to said spindle drive member; a drive connection from said spindle drive member to said screw, comprising a speed change gear adjustable to rotate said screw at different speeds; and a tap operating connection on the front end of said spindle having a free rotary play providing a limited relative rotary movement of said spindle and said tap and having axial play to compensate for differences in the advance of said tap from the advance of said spindle.

5. In a tapping machine of the character described for operating a tap, the combination of: a spindle arranged for axial and rotary movement; a screw connected to said spindle so that axial movement of said screw will produce axial movement of said spindle; guides disposed on opposite sides of said screw; carriages movable on said guides toward and away from said screw; a pair of crank members mounted in operative relation to said carriages, the swinging ends of said crank members being disposed so as to move transversely to the direction of movement of said carriages and being connected to said carriages so that movement of said crank members will move said carriages into positions near said screw and lock said carriages in said positions when said crank members are disposed substantially perpendicularly to the axis of said screws; partial nuts supported by said carriages so as to be moved toward and away from said screw; nut adjusting means operative between said partial nuts and said carriages to adjust said partial nuts toward said screw so that adjusted engagement of said partial nuts with said screw may be obtained; a spindle drive member engaging said spindle and having sliding engagement therewith to enable axial movement of said spindle relatively to said drive member; means operating to simultaneously rotate said screw, comprising a speed change gear adjustable to rotate said screw at different speeds; and means connecting a tap to the tap end of said spindle, comprising telescoped parts, one of which is connected to said spindle and the other of which is connected to said tap, said parts having driving shoulder means and driven shoulder means permitting a limited free rotary movement of said parts, and said parts having axial relative movement to compensate for differences in axial movement of said spindle and said tap when the tap is in engagement with the part being tapped.

6. In a tapping machine of the character described, the combination of: a spindle mounted for axial and rotary movement; a spindle drive member engaging said spindle and having sliding engagement therewith to enable axial movement of said spindle relatively to said drive member; means to drive said drive member from a source of power; a lead screw supported in spaced relation to said spindle; nut means engaging said lead screw; a spindle-moving connection between said lead screw and said spindle; means to drive said lead screw at different speeds relatively to the speed of said spindle as taps of different sizes are used comprising a drive gear driven by said spindle drive member and speed change gearing connecting said drive gear and said lead screw; and a tap operating connection secured to the front end of said spindle having therein means enabling axial movement of said tap relatively to said spindle and angularly spaced driving and driven shoulders disposed between the spindle and the tap to compensate for lost motion in said speed change gearing.

7. In a tapping machine of the character described, the combination of: a spindle mounted for axial and rotary movement; a spindle drive member engaging said spindle and having sliding engagement therewith to enable axial movement of said spindle relatively to said drive member; means to drive said drive member from a source of power; a lead screw supported in spaced relation to said spindle; nut means engaging said lead screw; a spindle moving connection between said lead screw and said spindle; and means to drive said lead screw at different speeds relatively to the speed of said spindle as taps of different sizes are used comprising a drive gear driven by said spindle drive member and speed change gearing connecting said drive gear and said lead screw.

EARL B. ELDER.

REFERENCES CITED

The following references are of record in the file of this patent:

UNITED STATES PATENTS

| Number | Name | Date |
|---|---|---|
| 945,387 | Hanson | Jan. 4, 1910 |
| 1,236,414 | Eden | Aug. 14, 1917 |
| 1,376,791 | Baker et al. | May 3, 1921 |
| 1,627,236 | Galloway | May 3, 1927 |
| 1,657,274 | Neidhammer | Jan. 24, 1928 |
| 1,670,287 | Stickney | May 15, 1928 |
| 1,673,897 | Barnes | June 19, 1928 |
| 1,763,717 | Morgan | June 17, 1930 |
| 1,793,259 | Smeuninx | Feb. 17, 1931 |
| 1,796,352 | Watson | Mar. 17, 1931 |
| 1,813,480 | Brown | July 7, 1931 |
| 1,836,471 | Knight et al. | Dec. 15, 1931 |
| 1,836,675 | Lyon | Dec. 15, 1931 |
| 1,861,350 | Mansfield | May 31, 1932 |
| 1,909,055 | Hageman | May 16, 1933 |
| 1,988,967 | Emrick | Jan. 22, 1935 |
| 2,028,441 | Decker | Jan. 21, 1936 |
| 2,043,862 | Newman | June 9, 1936 |
| 2,167,401 | Foster et al. | July 25, 1939 |
| 2,257,364 | Bakewell | Sept. 30, 1941 |
| 2,327,279 | Mansfield | Aug. 17, 1943 |
| 2,368,359 | Hellstrom | Jan. 30, 1945 |
| 2,376,164 | Miller et al. | May 15, 1945 |

FOREIGN PATENTS

| Number | Country | Date |
|---|---|---|
| 506,436 | Great Britain | May 30, 1939 |

Certificate of Correction

Patent No. 2,567,511                                                  September 11, 1951

EARL B. ELDER

It is hereby certified that error appears in the printed specification of the above numbered patent requiring correction as follows:

Column 14, list of references cited, insert, in numerical order:
2,356,438    Wilson _____ Aug. 22, 1944
2,392,039    Gideon _____ Jan. 1, 1946 and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*